United States Patent
Fahland

(10) Patent No.: US 9,333,994 B1
(45) Date of Patent: May 10, 2016

(54) ADJUSTABLE SPOILER FOR A MOTOR VEHICLE

(71) Applicant: GM GLOBAL TECHNOLOGY OPERATIONS LLC, Detroit, MI (US)

(72) Inventor: Jason D. Fahland, Davisburg, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/601,307

(22) Filed: Jan. 21, 2015

(51) Int. Cl.
*B62D 35/00* (2006.01)
*G05D 3/00* (2006.01)

(52) U.S. Cl.
CPC ............... *B62D 35/007* (2013.01); *G05D 3/00* (2013.01)

(58) Field of Classification Search
CPC ............................ B62D 35/005; B62D 35/007
USPC ......................................................... 701/49
See application file for complete search history.

(56) References Cited

U.S. PATENT DOCUMENTS

| | | | | |
|---|---|---|---|---|
| 4,925,236 A | * | 5/1990 | Itoh | B62D 35/008 296/180.1 |
| 6,447,049 B1 | * | 9/2002 | Tohda | B60R 19/12 293/117 |
| 2008/0116717 A1 | * | 5/2008 | Honeycutt | B62D 37/02 296/180.5 |
| 2013/0226414 A1 | * | 8/2013 | De Luca | B62D 37/02 701/49 |
| 2014/0371949 A1 | * | 12/2014 | Jeon | B60W 50/10 701/1 |

* cited by examiner

*Primary Examiner* — Fadey Jabr
*Assistant Examiner* — Aaron L Troost
(74) *Attorney, Agent, or Firm* — Quinn Law Group, PLLC

(57) ABSTRACT

A vehicle includes a vehicle body arranged in a body plane and having a longitudinal body axis. The vehicle also has a first vehicle body end configured to face oncoming ambient airflow when the vehicle is in motion relative to a road surface. The vehicle additionally includes a spoiler assembly. The spoiler assembly includes a wing-shaped body arranged along a spoiler axis that is parallel to the body plane and configured to control a movement of the ambient airflow along the longitudinal body axis. The spoiler assembly also includes a stanchion connecting the wing-shaped body to the vehicle body. The spoiler assembly additionally includes a mechanism configured to rotate the wing-shaped body to thereby vary an angle of the spoiler axis relative to the longitudinal body axis.

20 Claims, 2 Drawing Sheets

ADJUSTABLE SPOILER FOR A MOTOR VEHICLE

TECHNICAL FIELD

The disclosure relates to an adjustable spoiler for enhancement of aerodynamics of a motor vehicle.

BACKGROUND

Automotive aerodynamics is the study of aerodynamics of road vehicles. The main goals of the study are reducing drag and wind noise, minimizing noise emission, and preventing undesired lift forces and other causes of aerodynamic instability at high speeds. Additionally, the study of aerodynamics may also be used to achieve downforce in high-performance vehicles in order to improve vehicle traction and cornering abilities. The study is typically used to shape vehicle bodywork along with employing dedicated aerodynamic devices for achieving a desired compromise among the above characteristics for specific vehicle use.

A spoiler is an automotive aerodynamic device intended to "spoil" unfavorable air movement across a body of a vehicle in motion, usually described as turbulence or drag. Spoilers can be fitted at the front and/or at the rear of the vehicle body. Spoilers on the front of a vehicle are often called air dams. When the vehicle is in motion, in addition to directing air flow, such air dams also reduce the amount of air flowing underneath the vehicle which generally reduces aerodynamic lift and drag.

Additionally, when the vehicle is in motion, the flow of air at the rear of the vehicle becomes turbulent and a low-pressure zone is created, increasing drag and instability. Adding a spoiler at the rear of the vehicle body can help to delay flow separation from the body and a higher pressure zone created in front of the spoiler can help reduce lift on the vehicle body by creating downforce. As a result, in certain instances aerodynamic drag can be reduced and high speed stability will generally be increased due to the reduced rear lift.

SUMMARY

A vehicle includes a vehicle body arranged in a body plane and having a longitudinal body axis. The vehicle also has a first vehicle body end configured to face oncoming ambient airflow when the vehicle is in motion relative to a road surface. The vehicle additionally includes a spoiler assembly. The spoiler assembly includes a wing-shaped body arranged along a spoiler axis that is parallel to the body plane and configured to control a movement of the ambient airflow along the longitudinal body axis. The default position of the spoiler assembly may be such that the spoiler axis is transverse to the longitudinal body axis. The spoiler assembly also includes a stanchion connecting the wing-shaped body to the vehicle body. The spoiler assembly additionally includes a mechanism configured to rotate the wing-shaped body to thereby vary an angle of the spoiler axis relative to the longitudinal body axis. According to the disclosure, the mechanism may be arranged between the vehicle body and the stanchion or between the stanchion and the wing-shaped body.

The vehicle may also include an electronic controller configured to regulate the mechanism.

The vehicle may additionally include a road wheel and a first sensor configured to detect a rotating speed of the road wheel and communicate the detected rotating speed of the road wheel to the controller.

The vehicle may also include a second sensor configured to detect a yaw rate of the vehicle body and communicate the detected yaw rate to the controller.

The vehicle may additionally include a third sensor, such as a pitot tube, configured to detect a velocity of the ambient airflow relative to the vehicle and communicate the detected velocity of the ambient airflow to the controller.

The controller may be configured to vary the angle of the spoiler axis relative to the longitudinal body axis during vehicle cornering in response to the detected yaw rate and at least one of the detected rotating speed of the road wheel and velocity of the ambient airflow. Such varying of the angle of the spoiler axis relative to the longitudinal body axis during vehicle cornering is intended to vary aerodynamic downforce on the vehicle body in response to the detected yaw rate, such as to increase the downforce to thereby limit the detected yaw rate.

The mechanism may be configured to vary the angle of the spoiler axis relative to the longitudinal body axis above a predetermined velocity of the vehicle.

The mechanism may include at least one of a linear actuator and an electric motor.

The wing-shaped body of the spoiler assembly may be defined by a first end and a second end. The wing-shaped body may additionally include a first fin arranged proximate the first end and a second fin is arranged proximate the second end. Each of the first and second fins may be configured to control movement of the ambient airflow perpendicular to the longitudinal body axis.

The stanchion may connect the wing-shaped body to the vehicle body at the first vehicle body end.

The vehicle body may also include a second vehicle body end opposite of the first end. In such a case, the stanchion may connect the wing-shaped body to the vehicle body at the second vehicle body end.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
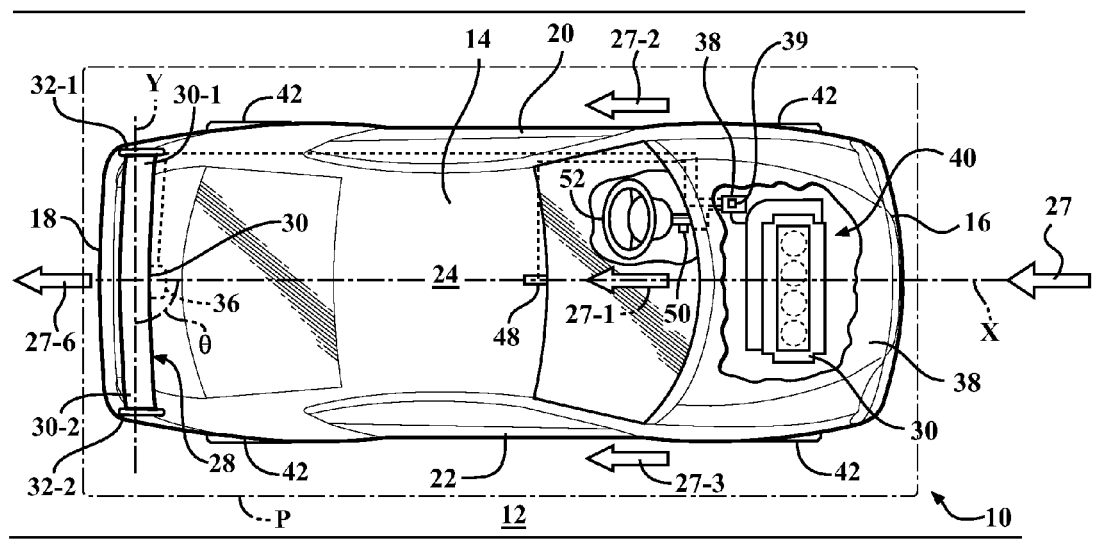
FIG. 1 is a schematic top view of a vehicle having a vehicle body arranged in a body plane along a longitudinal axis, and having a spoiler assembly according to an embodiment the disclosure.

Referring to the drawings, wherein like reference numbers refer to like components, FIG. 1 shows a schematic view of a motor vehicle 10 positioned relative to a road surface 12. The vehicle 10 includes a vehicle body 14 arranged in a body plane P that is substantially parallel to the road surface 12. The vehicle body 14 defines six body sides. The six body sides include a first body end or front end 16, an opposing second body end or rear end 18, a first lateral body side or left side 20, and a second lateral body side or right side 22, a top body portion 24, which may include a vehicle roof, and an underbody portion 26.

The left side 20 and right side 22 are disposed generally parallel to each other and with respect to a virtual longitudinal axis X of the vehicle 10, and span the distance between the front end 16 and the rear end 18. The body plane P is defined to include the longitudinal axis X. A passenger compartment (not shown) of the vehicle 10 is generally bounded by the front and rear ends 16, 18 and the left and right sides of the body 14. As understood by those skilled in the art, the front end 16 is configured to face an oncoming ambient airflow 27 when the vehicle 10 is in motion relative to the road surface 12. When the vehicle 10 is in motion, the oncoming ambient airflow 27 moves substantially parallel to the body plane P and along the longitudinal axis X.

As the vehicle 10 moves relative to the road surface 12, the ambient airflow 27 passes around the vehicle body 14 and splits into respective first airflow portion 27-1, second airflow portion 27-2, third airflow portion 27-3, and fourth airflow portion 27-4, that eventually rejoin in a wake area or recirculating airflow region 27-6 immediately behind the rear end 18. Specifically, as shown in FIG. 1, the first airflow portion 27-1 passes over the top body portion 24, second airflow portion 27-2 passes over the left side 20, third airflow portion 27-3 passes over the right side 22, and fourth airflow portion 27-4 (shown in FIG. 2) passes under the vehicle body 14, between the underbody portion 26 and the road surface 12. As understood by those skilled in the art, the recirculating airflow region 27-6 is generally caused at elevated vehicle speeds by the flow of surrounding air around the six body sides of the vehicle body 14.

Figure 2:
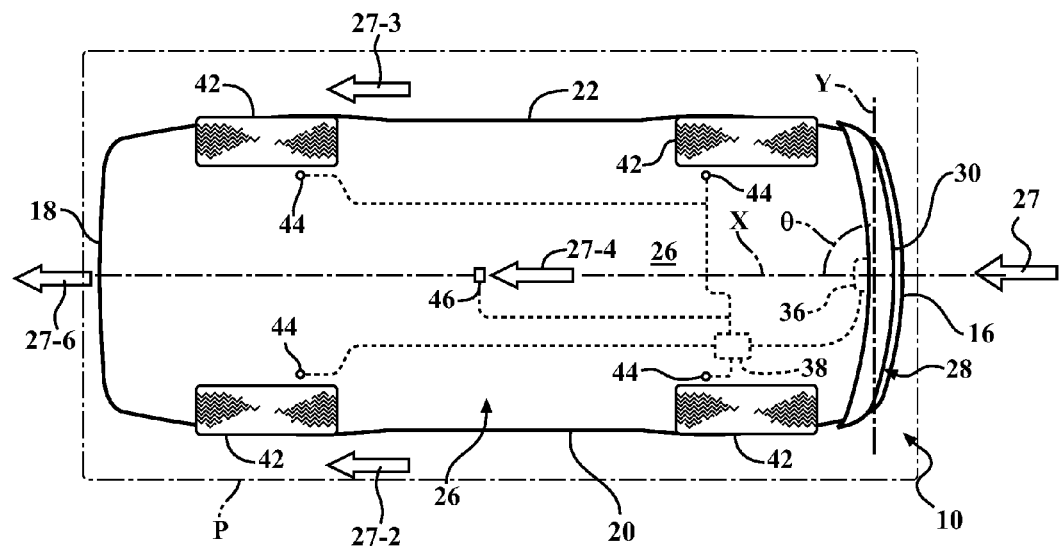
FIG. 2 is a schematic bottom view of the vehicle shown in FIG. 1 and having a spoiler assembly according to another embodiment the disclosure.

As shown in FIGS. 1 and 2, the vehicle 10 also includes a spoiler assembly 28. The spoiler assembly 28 includes a wing-shaped body 30 arranged along a spoiler axis Y and configured to control a movement of the ambient airflow 27 along the longitudinal body axis X of the vehicle body 14. "Wing-shaped" is herein defined as a fin having an airfoil shape, or a streamlined cross-sectional shape producing lift for flight or propulsion through a fluid. As can be seen in FIG. 1, the spoiler axis Y may be positioned initially and as a default transversely to the longitudinal body axis X. Additionally, the spoiler axis Y is also arranged substantially parallel to the body plane P. The wing-shaped body 30 is defined by a first end 30-1 and a second end 30-2. The wing-shaped body 30 may be formed from a suitably rigid but low mass material, such as an engineered plastic or aluminum, for structural stability. The wing-shaped body 30 additionally includes a first fin 32-1 arranged proximate the first end 30-1 and a second fin 32-2 that is arranged proximate the second end 30-2. Each of the first and second fins 32-1, 32-2 includes a respective fin axis X1, X2 that may be substantially parallel to the longitudinal body axis X. Accordingly, the first and second fins 32-1, 32-2 may be configured to control movement of the ambient airflow 27 perpendicular to the longitudinal body axis X.

Figure 3:
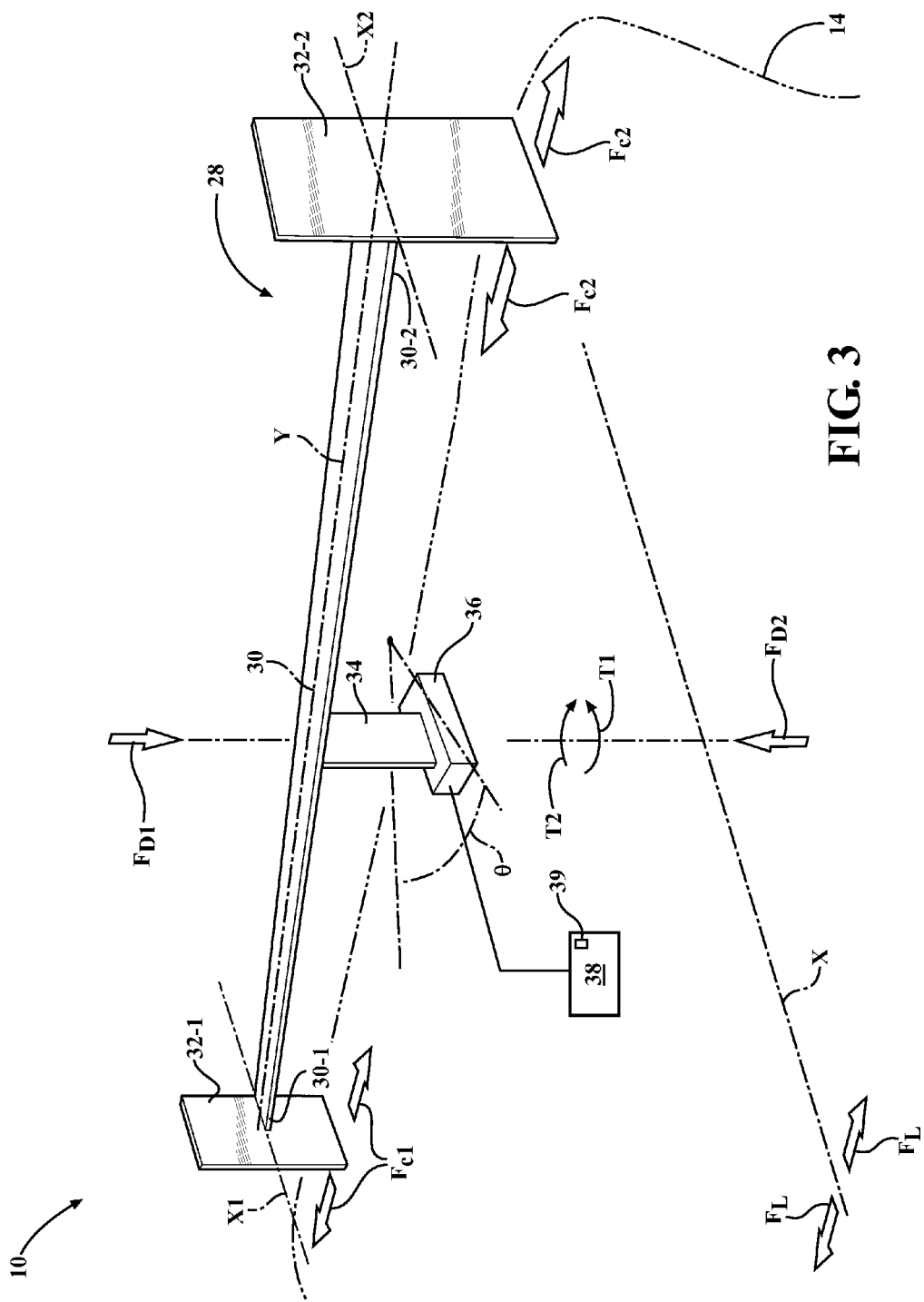
FIG. 3 is a schematic perspective view of a representative spoiler assembly for each of the embodiments shown in FIGS. 1 and 2.

As shown in FIG. 3, the spoiler assembly 28 additionally includes a stanchion 34 connecting the wing-shaped body 30 to the vehicle body 14. The spoiler assembly 28 may include a single stanchion 34 or a plurality of such stanchions mounted to the vehicle body. The stanchion(s) 34 may connect the wing-shaped body 30 at the front end 16. Similarly, the stanchion(s) 34 may connect the wing-shaped body 30 at the rear end 18. When mounted on the front end 16 of the vehicle body 14 (as shown in FIG. 2), the spoiler assembly 28 functions as an air dam that varies a downforce $F_{D1}$ exerted by the ambient airflow 27 at the front of the vehicle. On the other hand, when the spoiler assembly 28 is mounted on the rear end 18 of the vehicle body 14 (as shown in FIG. 1), the spoiler assembly varies a downforce $F_{D2}$ exerted by the ambient airflow 27 at the rear of the vehicle. Accordingly, the spoiler assembly 28 mounted on the front end 16 may be employed to increase the downforce $F_{D1}$ at the front of the vehicle, while the spoiler assembly mounted on the rear end 18 may be employed to increase the downforce $F_{D2}$ at the rear of the vehicle in order to increase vehicle traction. The stanchion 34 is configured to support the wing-shaped body 30 relative to the vehicle body 14 in order to apply the respective downforce $F_{D1}$ or $F_{D2}$ to the vehicle body when the vehicle 10 is in motion.

As shown in FIGS. 1-3, the spoiler assembly 28 also includes a mechanism 36. The mechanism 36 is configured to rotate the wing-shaped body 30 to thereby vary an angle θ of the spoiler axis Y relative to the longitudinal body axis X. The mechanism 36 may either be positioned between the vehicle body 14 and the stanchion 34 or between the stanchion and the wing-shaped body 30. The mechanism 36 may include a suitable device for generating movement of the wing-shaped body 30, such as a linear actuator and/or an electric motor (not shown, but understood by those skilled in the art). The mechanism 36 may also include a gear drive, such as a reduction gear-set, which may be coupled to the device, such as the linear actuator or electric motor, in order to effect desired rotation of the wing-shaped body 30 relative to the vehicle body 14. As shown in FIG. 3, the mechanism 36 may be configured to apply a torque T1 to rotate the wing-shaped body 30 in one direction and an opposite torque T2 to rotate the wing-shaped body in the opposite direction.

As shown in FIGS. 1-3, the vehicle also includes an electronic controller 38 configured, i.e., constructed and programmed, to regulate the mechanism 36. The controller 38 may be configured as a central processing unit (CPU) configured to regulate operation of an internal combustion engine 40 (shown in FIG. 1), a hybrid-electric powertrain (not shown), or other alternative types of powerplants, as well as other vehicle systems, or a dedicated controller. In order to appropriately control operation of the mechanism 36, the controller 38 includes a memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 38 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 38 may also include a floppy disk, a flexible disk, hard disk, magnetic tape, any other magnetic medium, a CD-ROM, DVD, any other optical medium, etc. The controller 38 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 38 or accessible thereby may be stored in the memory and automatically executed to provide the required functionality.

As shown in FIGS. 1-3, the vehicle 10 also includes road wheels 42. A plurality of first sensors 44 may be arranged on the vehicle body 14 for detecting rotating speeds of each road wheel 42 (shown in FIG. 2). Each first sensor 44 may also be configured to communicate the detected rotating speed of the respective road wheel 42 to the controller 38, while the controller may be configured to correlate the data received from the respective first sensors to road speed of the vehicle 10. The vehicle 10 may also include a second sensor 46 (shown in FIG. 2) configured to detect a yaw moment or rate on the vehicle body 14 relative to the road surface 12 and communicate the detected yaw rate to the controller 38. The vehicle may additionally include a third sensor 48 (shown in FIG. 1) configured to detect a velocity of ambient airflow 27 relative to the vehicle 10 and communicate the detected velocity of the ambient airflow to the controller 38. The third sensor 48 may be a pitot tube configured to detect a pressure of the ambient airflow 27 at a specific location relative to the vehicle body 14, and the controller 38 can correlate the measured pressure to airflow velocity.

The controller 38 is additionally configured to vary the angle θ of the spoiler axis Y relative to the longitudinal body axis X during cornering of the vehicle 10 in response to the yaw rate detected by the second sensor 46. Furthermore, the controller 38 may be configured to vary the angle θ in response to the rotating speeds of the road wheels 42 detected via the first sensor 44 and/or the velocity of the ambient airflow 27 detected via the third sensor 48. Accordingly, the angle θ of the spoiler axis Y can be controlled relative to the longitudinal body axis X proportionately to the yaw rate generated during cornering of the vehicle 10 by turning the wing-shaped body 30 of the spoiler assembly 28. The controller 38 may be programmed with a look-up table 39 establishing correspondence between the vehicle yaw rate, vehicle road speed, and/or velocity of the airflow and appropriate angle θ of the spoiler axis Y for affecting appropriate regulation of the mechanism 36. The look-up table 39 may be developed empirically during validation and testing of the vehicle 10.

As the angle θ of the wing-shaped body 30 is varied during the cornering event, the spoiler assembly 28 positioned at the front end 16 is able to use the ambient airflow 27 more effectively in order to maximize the downforce $F_{D1}$ at the front end of the vehicle body 14. Similarly, the spoiler assembly 28 positioned at the rear end 18 is able to use the ambient airflow 27 more effectively during the cornering event in order to maximize the downforce $F_{D2}$ at the rear end of the vehicle body 14. Additionally, as the wing-shaped body 30 is turned, the first and second fins 32-1, 32-2 can generate a force $F_{C1}$, $F_{C2}$ on the vehicle body 14 that is directly counter to a lateral force $F_L$ generated by lateral acceleration during cornering of the vehicle 10.

The controller 38 may be additionally programmed to determine a slip of the vehicle 10 relative to the road surface 12. The slip of the vehicle 10 may include a measure of how much each of the road wheels 42 has slipped in a direction that is generally perpendicular to the longitudinal vehicle axis X, which identifies that the vehicle has deviated from an intended direction or path along the road surface 12. The intended direction of the vehicle 10 may be identified by the steering wheel angle, which can be detected by a fourth sensor 50 operatively connected to a steering wheel 52 (shown in FIG. 1) and communicated to the controller 38. Furthermore, the controller 38 may be programmed to compare the determined steering wheel angle and yaw rate to determine how much the vehicle has deviated from its intended direction or path.

The controller 38 may also be programmed to control the slip of the vehicle 10 relative to the road surface 12 by controlling rotation of the wing-shaped body 30 via the mechanism 36 in response to how much the vehicle has deviated from its intended path. The employed rotation of the wing-shaped body 30 then urges the vehicle 10 to return to the actual vehicle heading to the desired heading being commanded by an operator of the vehicle at the steering wheel 52. Additionally, two third sensors 48 may be arranged on the wing-shaped body 30, one on the first end 30-1 and one on the second end 30-2 (not shown). The controller 38 may then be configured to vary the angle θ of the spoiler axis Y relative to the longitudinal body axis X in response to a determined differential between air velocity measurements at each third sensor 48 as the vehicle 10 enters and negotiates a turn to vary the downforce $F_{D1}$ on the vehicle body 14.

Accordingly, control of the rotation of the wing-shaped body 30 may be employed to maintain contact of the vehicle 10 with the road surface 12 at elevated speeds by countering aerodynamic lift of the vehicle body 14 in response to the velocity of ambient airflow 27 detected by the third sensor 48. Additionally, control of the rotation of the spoiler assembly 28 may be employed to aid handling of the vehicle 10 in order to maintain the vehicle on its intended path by countering the yaw moment acting on the vehicle body 14 as detected by the second sensor 46.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle comprising:
    a vehicle body arranged in a body plane, and having a longitudinal body axis and a first vehicle body end configured to face oncoming ambient airflow when the vehicle is in motion relative to a road surface; and
    a spoiler assembly having:
        a wing-shaped body arranged along a spoiler axis that is parallel to the body plane and transverse to the longitudinal body axis, wherein the wing-shaped body is configured to control a movement of the ambient airflow along the longitudinal body axis;
        a stanchion connecting the wing-shaped body to the vehicle body; and
        a mechanism configured to rotate the wing-shaped body to thereby vary an angle of the spoiler axis relative to the longitudinal body axis.

2. The vehicle according to claim 1, further comprising an electronic controller configured to regulate the mechanism.

3. The vehicle according to claim 2, further comprising a road wheel and a first sensor configured to detect a rotating speed of the road wheel and communicate the detected rotating speed of the road wheel to the controller.

4. The vehicle according to claim 3, further comprising a second sensor configured to detect a yaw rate of the vehicle body and communicate the detected yaw rate to the controller.

5. The vehicle according to claim 4, further comprising a third sensor configured to detect a velocity of ambient airflow relative to the vehicle and communicate the detected velocity of the ambient airflow to the controller.

6. The vehicle according to claim 5, wherein the controller is configured to vary the angle of the spoiler axis relative to the longitudinal body axis during vehicle cornering in response to the detected yaw rate and at least one of the detected rotating speed of the road wheel and velocity of the ambient airflow, to thereby vary aerodynamic downforce on the vehicle body and control the detected yaw rate.

7. The vehicle according to claim 1, wherein the mechanism includes at least one of a linear actuator and an electric motor.

8. The vehicle according to claim 1, wherein:
the wing-shaped body is defined by a first end and a second end;
the wing-shaped body additionally includes a first fin arranged proximate the first end and a second fin arranged proximate the second end; and
each of the first and second fins is configured to control movement of the ambient airflow perpendicular to the longitudinal body axis.

9. The vehicle according to claim 1, wherein the stanchion connects the wing-shaped body to the vehicle body at the first vehicle body end.

10. The vehicle according to claim 1, wherein the vehicle body includes a second vehicle body end opposite of the first end, and wherein the stanchion connects the wing-shaped body to the vehicle body at the second vehicle body end.

11. A vehicle comprising:
a vehicle body arranged in a body plane, and having a longitudinal body axis and a first vehicle body end configured to face oncoming ambient airflow when the vehicle is in motion relative to a road surface; and
a spoiler assembly having:
a wing-shaped body arranged along a spoiler axis that is parallel to the body plane and transverse to the longitudinal body axis, wherein the wing-shaped body is configured to control a movement of the ambient airflow along the longitudinal body axis;
a stanchion connecting the wing-shaped body to the vehicle body;
a mechanism configured to rotate the wing-shaped body to thereby vary an angle of the spoiler axis relative to the longitudinal body axis; and
an electronic controller configured to regulate the mechanism.

12. The vehicle according to claim 11, further comprising a road wheel and a first sensor configured to detect a rotating speed of the road wheel and communicate the detected rotating speed of the road wheel to the controller.

13. The vehicle according to claim 12, further comprising a second sensor configured to detect a yaw rate of the vehicle body and communicate the detected yaw rate to the controller.

14. The vehicle according to claim 13, further comprising a third sensor configured to detect a velocity of the ambient airflow relative to the vehicle and communicate the detected velocity of the ambient airflow to the controller.

15. The vehicle according to claim 14, wherein the controller is configured to vary the angle of the spoiler axis relative to the longitudinal body axis during vehicle cornering in response to the detected yaw rate and at least one of the detected rotating speed of the road wheel and velocity of the ambient airflow, to thereby vary aerodynamic downforce on the vehicle body and control the detected yaw rate.

16. The vehicle according to claim 15, wherein the mechanism is configured to vary the angle of the spoiler axis relative to the longitudinal body axis above a predetermined velocity of the vehicle.

17. The vehicle according to claim 11, wherein the mechanism includes at least one of a linear actuator and an electric motor.

18. The vehicle according to claim 11, wherein the stanchion has a stanchion axis that intersects and is perpendicular to the longitudinal body axis.

19. The vehicle according to claim 11, wherein:
the wing-shaped body is defined by a first end and a second end;
the wing-shaped body additionally includes a first fin arranged proximate the first end and a second fin arranged proximate the second end; and
each of the first and second fins is configured to control movement of the ambient airflow perpendicular to the longitudinal body axis.

20. The vehicle according to claim 11, wherein the vehicle body includes a second vehicle body end opposite of the first end, and wherein the stanchion connects the wing-shaped body to the vehicle body at one of the first vehicle body end and the second vehicle body end.

* * * * *